US012591404B2

(12) United States Patent (10) Patent No.: US 12,591,404 B2
Jiang et al. (45) Date of Patent: Mar. 31, 2026

(54) HUMAN-COMPUTER INTERFACE-DRIVEN DEMAND-AWARE SCREEN SHARING

(71) Applicant: International Business Machines Corporation, Armonk, NY (US)

(72) Inventors: Peng Hui Jiang, Beijing (CN); Su Liu, Austin, TX (US); Guang Han Sui, Beijing (CN); Glen Corneau, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 178 days.

(21) Appl. No.: 18/438,540

(22) Filed: Feb. 12, 2024

(65) Prior Publication Data

US 2025/0258636 A1     Aug. 14, 2025

(51) Int. Cl.
*G06F 3/14*     (2006.01)
*G10L 15/08*     (2006.01)
*H04L 65/403*     (2022.01)

(52) U.S. Cl.
CPC ............ *G06F 3/1454* (2013.01); *G10L 15/08* (2013.01); *H04L 65/403* (2013.01); *G10L 2015/088* (2013.01)

(58) Field of Classification Search
CPC . G06F 3/1454; G10L 15/08; G10L 2015/088; H04L 65/403; H04L 65/1089; H04L 65/4015
See application file for complete search history.

(56) References Cited

U.S. PATENT DOCUMENTS

| | | | |
|---|---|---|---|
| 7,203,755 B2 | 4/2007 | Zhu | |
| 8,848,026 B2 | 9/2014 | Deland | |
| 9,299,061 B2 | 3/2016 | Scherpa | |
| 10,581,939 B2 | 3/2020 | Ingale | |
| 11,514,691 B2 * | 11/2022 | Perera ................... | G06V 30/40 |
| 11,579,832 B2 * | 2/2023 | Nakamura .......... | G06F 3/04883 |
| 11,755,626 B1 * | 9/2023 | Liu ..................... | G06F 16/2237 707/738 |
| 11,886,815 B2 * | 1/2024 | Gu ........................ | G06N 3/0455 |
| 2006/0031779 A1 | 2/2006 | Theurer | |
| 2006/0265262 A1 * | 11/2006 | Kamdar ............... | G06Q 10/109 705/80 |
| 2010/0131868 A1 | 5/2010 | Chawla | |

(Continued)

OTHER PUBLICATIONS

Disclosed Anonymously, "Contextual Split screen sharing method in online web conferencing", An IP.com Prior Art Database Technical Disclosure, IP.com No. IPCOM000262834D, IP.com Electronic Publication Date: Jul. 6, 2020, 4 Pages.

(Continued)

*Primary Examiner* — Dmitriy Bolotin
(74) *Attorney, Agent, or Firm* — Michael O'Keefe

(57) ABSTRACT

According to one embodiment, a method, computer system, and computer program product for demand-aware screen sharing is provided. The embodiment may include initiating a virtual conference between two or more participants. The embodiment may also include monitoring an audio feed of the virtual conference. The embodiment may further include identifying a trigger event in the monitored audio feed. The embodiment may also include performing a screen sharing action based on the identified trigger event.

9 Claims, 3 Drawing Sheets

(56) References Cited

U.S. PATENT DOCUMENTS

| | | | |
|---|---|---|---|
| 2016/0037129 A1* | 2/2016 | Tangeland | G06V 40/16 |
| | | | 348/14.09 |
| 2017/0060350 A1* | 3/2017 | Zheng | G06F 9/452 |
| 2019/0097824 A1 | 3/2019 | Barr | |
| 2019/0289198 A1* | 9/2019 | Bosworth | H04N 23/66 |
| 2020/0250562 A1* | 8/2020 | Bly | G06F 16/24578 |
| 2020/0258525 A1* | 8/2020 | Mcquiston | G10L 15/26 |
| 2020/0394461 A1* | 12/2020 | Perera | G06N 7/01 |
| 2022/0284402 A1* | 9/2022 | Vangala | G06N 5/04 |
| 2022/0286488 A1* | 9/2022 | Berliner | H04L 51/58 |
| 2023/0051262 A1* | 2/2023 | Yanez | G06F 9/452 |
| 2023/0259437 A1* | 8/2023 | White | H04N 7/15 |
| | | | 710/18 |
| 2024/0212290 A1* | 6/2024 | Hughes | G06F 3/011 |

OTHER PUBLICATIONS

Disclosed Anonymously, "Multiple Screen Sharing", An IP.com Prior Art Database Technical Disclosure, IP.com No. IPCOM000272066D, IP.com Electronic Publication Date: Apr. 4, 2023, 8 Pages.

Disclosed Anonymously, "System and method to display presentations intelligently during web meeting", An IP.com Prior Art Database Technical Disclosure, IP.com No. IPCOM000250544D, IP.com Electronic Publication Date: Aug. 1, 2017, 5 Pages.

Jeuk et al., "Context-Aware Screen Sharing For Online Meetings", Technical Disclosure Commons, Defensive Publications Series, Feb. 2022, 13 Pages.

Valuates, "Global Web Conferencing Market Insights and Forecast to 2028", Valuates, Apr. 2020, 4 Pages.

\* cited by examiner

100

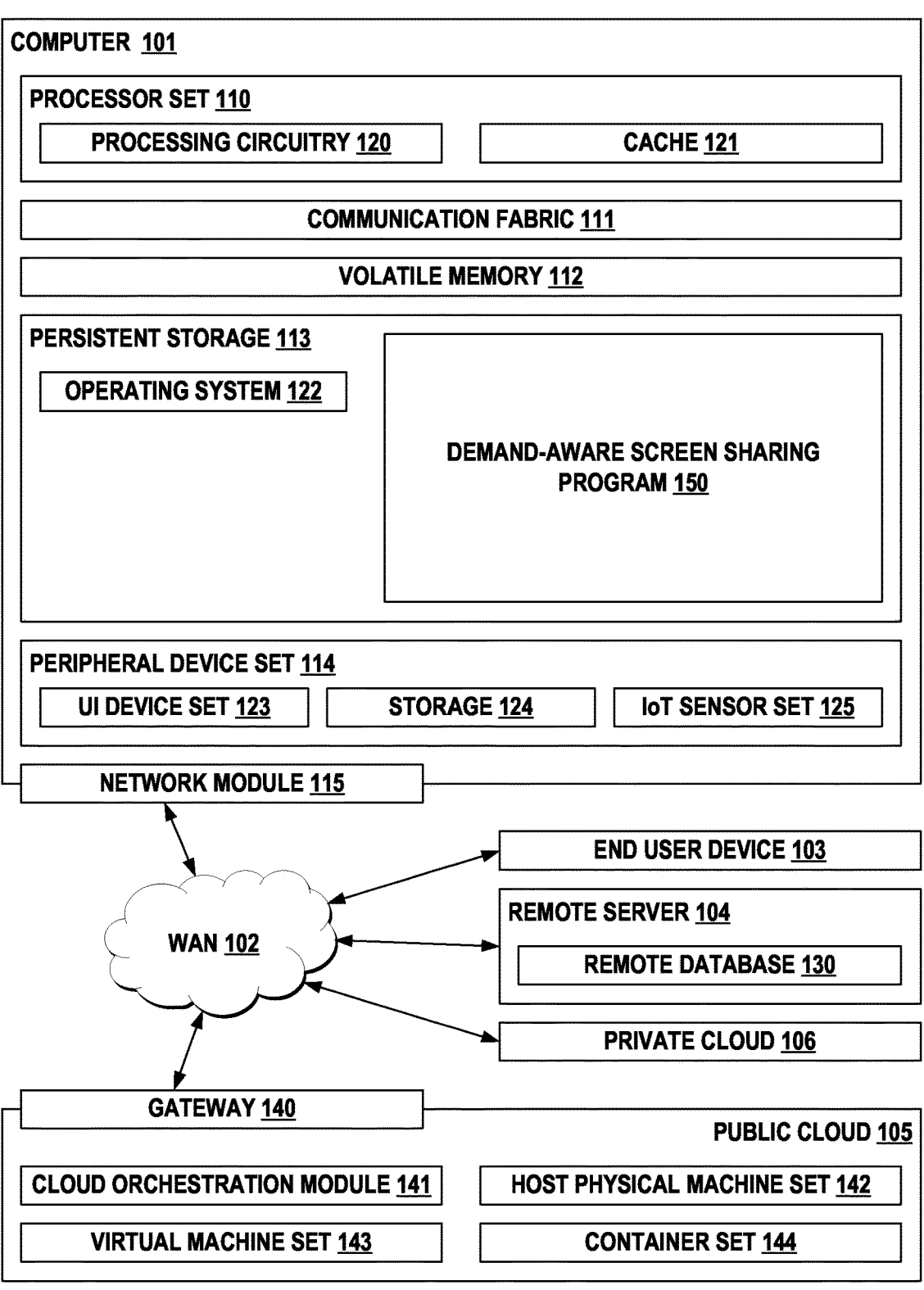

COMPUTER 101

PROCESSOR SET 110

PROCESSING CIRCUITRY 120

CACHE 121

COMMUNICATION FABRIC 111

VOLATILE MEMORY 112

PERSISTENT STORAGE 113

OPERATING SYSTEM 122

DEMAND-AWARE SCREEN SHARING PROGRAM 150

PERIPHERAL DEVICE SET 114

UI DEVICE SET 123

STORAGE 124

IoT SENSOR SET 125

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

CLOUD ORCHESTRATION MODULE 141

HOST PHYSICAL MACHINE SET 142

VIRTUAL MACHINE SET 143

CONTAINER SET 144

FIG. 1

200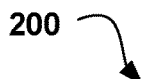
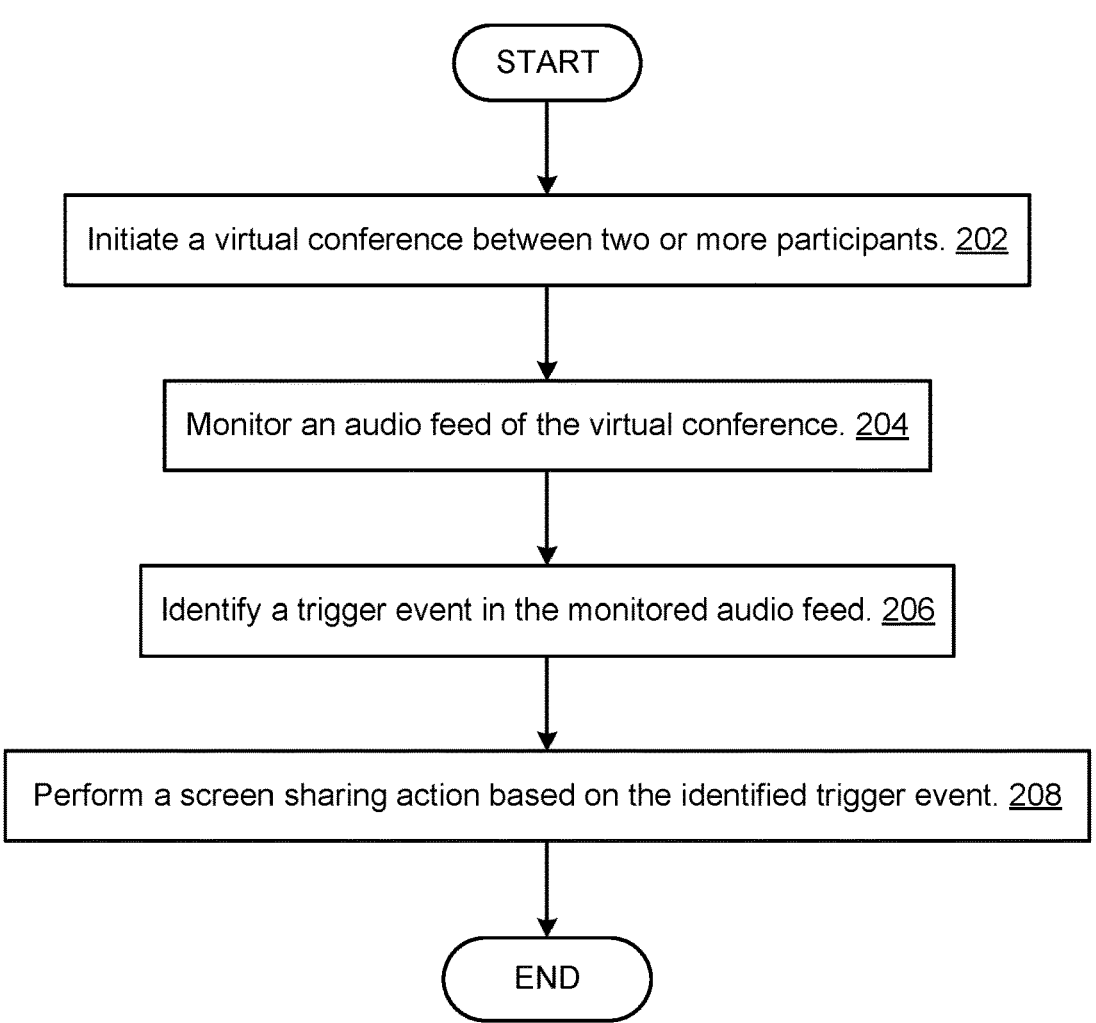
FIG. 2

HUMAN-COMPUTER INTERFACE-DRIVEN DEMAND-AWARE SCREEN SHARING

BACKGROUND

The present invention relates generally to the field of computing, and more particularly to web conferencing.

Web conferencing, including but not limited to audio conferencing and video conferencing, may relate to any communication between two or more individuals over a network, such as the Internet, where the participating members utilize audio and/or video streams. Web conferencing allows for a dynamic interface between users in separate locations to efficiently communicate as if they were in person by allowing face-to-face interactions and the sharing of files between participating users. Popular web conferencing applications include Zoom® (Zoom and all Zoom-based trademarks and logos are trademarks or registered trademarks of Zoom Video Communications Inc. and/or its affiliates), Webex® (Webex and all Webex-based trademarks and logos are trademarks or registered trademarks of Webex Communications, Inc. and/or its affiliates), GoToMeeting® (GoToMeeting and all GoToMeeting-based trademarks and logos are trademarks or registered trademarks of Citrix Online, LLC. and/or its affiliates), and FaceTime® (Facetime and all Facetime-based trademarks and logos are trademarks or registered trademarks of Apple Inc. and/or its affiliates) among others.

SUMMARY

According to one embodiment, a method, computer system, and computer program product for demand-aware screen sharing is provided. The embodiment may include initiating a virtual conference between two or more participants. The embodiment may also include monitoring an audio feed of the virtual conference. The embodiment may further include identifying a trigger event in the monitored audio feed. The embodiment may also include performing a screen sharing action based on the identified trigger event.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings:

FIG. 1 illustrates an exemplary networked computer environment according to at least one embodiment.

FIG. 2 illustrates an operational flowchart for a demand-aware screen sharing process according to at least one embodiment.

DETAILED DESCRIPTION

Figure 3:
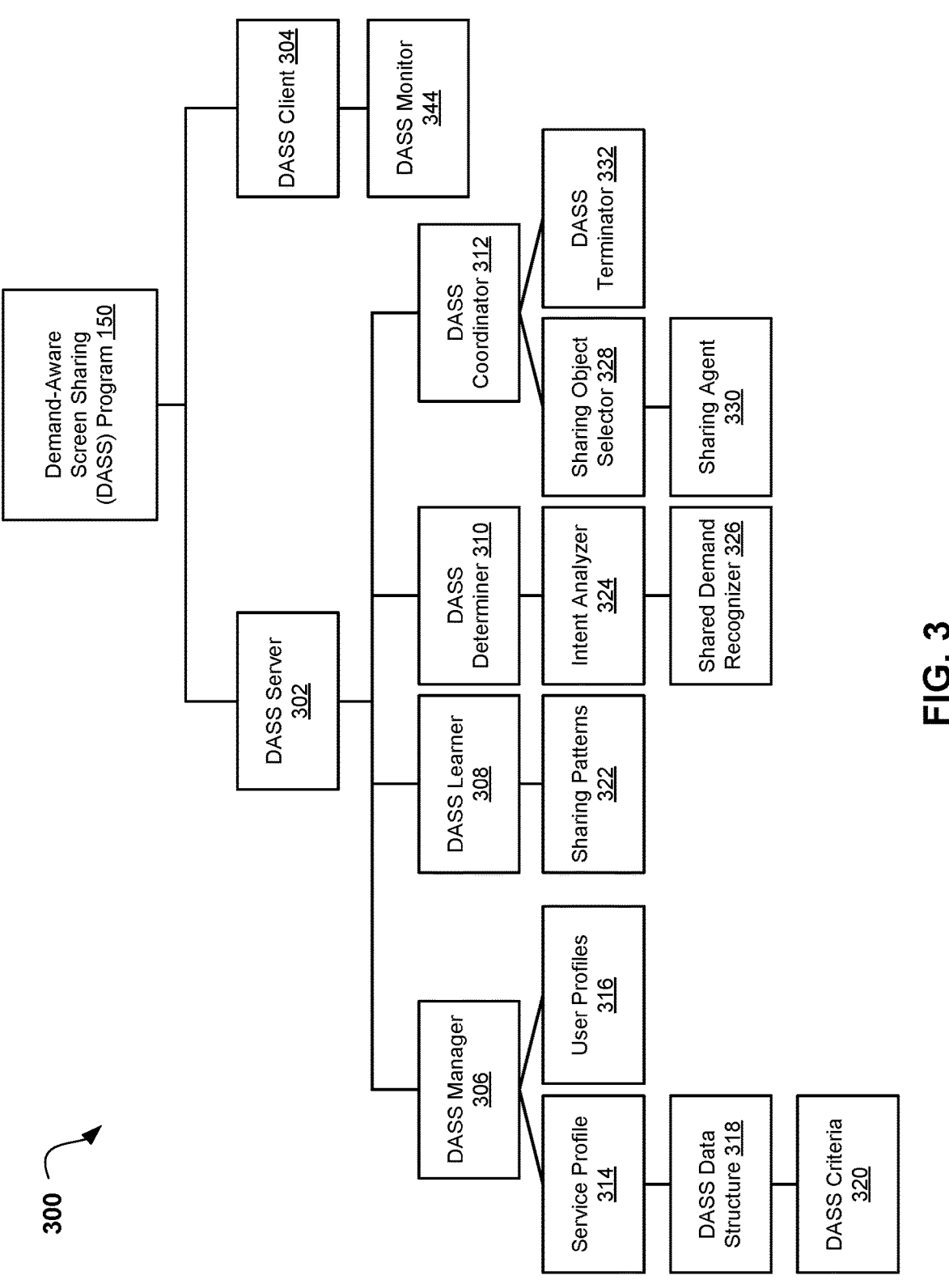
FIG. 3 illustrates a functional block diagram of software components used in a demand-aware screen sharing process according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments of the present invention relate to the field of computing, and more particularly to web conferencing. The following described exemplary embodiments provide a system, method, and program product to, among other things, provide demand-aware screen sharing functionality with automatic coordination in a web conference. Therefore, the present embodiment has the capacity to improve the technical field of web conferencing by streamlining the screen sharing process through automatically suggesting when and what content to share that reduces interruptions and disruptions, allowing for a more intuitive and user-friendly screen sharing experience. Furthermore, by analyzing human-computer interactions and real-time conversations, screen sharing may be aligned with the ongoing discussion in the web conference allowing for a more context-aware and relevant discussion. Demand-aware functionality may also improve privacy and reduce security risks in a web conference screen sharing session due to accidental sharing of unrelated or sensitive content. Additionally, web conferences may become more versatile and adaptable to different scenarios, including presentations, collaborative work, and training sessions when demand-aware screen sharing is utilized.

As previously described, web conferencing, including but not limited to audio conferencing and video conferencing, may relate to any communication between two or more individuals over a network, such as the Internet, where the participating members utilize audio and/or video streams. Web conferencing allows for a dynamic interface between users in separate locations to efficiently communicate as if they were in person by allowing face-to-face interactions and the sharing of files between participating users. Popular web conferencing applications include Zoom® (Zoom and all Zoom-based trademarks and logos are trademarks or registered trademarks of Zoom Video Communications Inc. and/or its affiliates), Webex® (Webex and all Webex-based trademarks and logos are trademarks or registered trademarks of Webex Communications, Inc. and/or its affiliates), GoToMeeting® (GoToMeeting and all GoToMeeting-based trademarks and logos are trademarks or registered trademarks of Citrix Online, LLC. and/or its affiliates), and FaceTime® (Facetime and all Facetime-based trademarks and logos are trademarks or registered trademarks of Apple Inc. and/or its affiliates) among others.

In the rapidly evolving landscape of virtual collaboration and remote work, the effective sharing of digital content during online meetings and web conferences has become integral to productive discussions and collaborative decision making. Screen sharing has emerged as a valuable tool for conveying ideas, presenting information, and facilitating real-time interactions among participants. However, the process of screen sharing in virtual meetings is riddled with challenges and inefficiencies that can hinder the flow of communication and compromise the collaborative experience. Challenges in the space include, but are not limited to, interruptions to the flow of the meeting caused by manual screen sharing, accidental initiation of screen sharing, demand-based sharing uncertainty, coordination complexity, and meeting disruptions.

Manual screen sharing interruptions require participants to manually initiate screen sharing, which often requires interrupting an ongoing web conference discussion, navigating through menus, and selecting the content to share. For example, in a web conference, the meeting host may initially want to share a document to discuss project updates. However, if the host must manually initiate screen sharing, the flow of the meeting is likely to be interrupted and potentially delaying the discussion.

Additionally, accidental screen sharing may result when a user initiates screen sharing of an unintended application, window, or monitor view or when a participant fails to stop screen sharing after presenting their intended content. This may result in accidental exposure of unrelated, confidential, or sensitive information that can potentially compromise data security and privacy.

Demand-based sharing uncertainty may relate to a participant being unaware or unsure of when to share or stop sharing their display screen view. Deciding when to interrupt the discussion and what content to share can be a source of uncertainty and hesitation that may derail productivity. For example, a participant may have relevant information in XYZ tool and would like to share a graphical user interface to the rest of the web conference. However, that participant must seek permission from the meeting host and go through a manual process to share their screen. This uncertainty about when and how to share content can be a disruption to the meeting.

Furthermore, coordination complexity may relate to multiple participants wishing to share their screens during a meeting and the difficulty that may result from such competing interests. For example, determining the order of sharing, ensuring relevance to the ongoing discussion, and minimizing interruptions can be challenging to manage manually. As such, it may be advantageous to, among other things, develop a program capable enhancing the screen sharing experience in web conferences through collection and utilization of HCI data to leverage screen sharing features and predict when and what content should be shared in the web conference thereby aligning screen sharing with user intentions and meeting context to mitigate disruptions and inefficiencies associated with traditional screen sharing practices.

According to at least one embodiment, a demand-aware screen sharing program may integrate principles of human-computer interaction to intelligently predict user intentions and demands for screen sharing during virtual meetings, resulting in a user-centric and context-aware experience. The demand-aware screen sharing program may also utilize a demand-aware approach to screen sharing that proactively identifies when an appropriate and relevant time arrives to share a user's screen with the other web conference participants based on real-time analysis of user interactions and communication patterns. The demand-aware screen sharing program offers an automated solution for coordinating screen sharing activities among multiple participants that optimizes the order and timing of sharing to minimize interruptions and disruptions to the web conference. The demand-aware screen sharing program may also reduce the need for manual initiation and decision-making by simplifying the screen sharing process, which allows for more intuitiveness and accessibility for participants. Additionally, the demand-aware screen sharing program may include robust privacy and security features that prevent accidental sharing of unrelated or sensitive content, thereby enhancing data protection.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Referring now to FIG. 1, computing environment 100 contains an example of an environment for the execution of at least some of the computer code involved in performing the inventive methods, such as demand-aware screen sharing program 150. In addition to demand-aware screen sharing program 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and demand-aware screen sharing program 150, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer, or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, for illustrative brevity. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in video demand-aware screen sharing program 150 in persistent storage 113.

Communication fabric 111 is the signal conduction path that allows the various components of computer 101 to communicate with each other. Typically, this fabric is made of switches and electrically conductive paths, such as the switches and electrically conductive paths that make up busses, bridges, physical input/output ports and the like.

Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel. The code included in video demand-aware screen sharing program 150 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN 102 and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community, or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

According to at least one embodiment, the demand-aware screen sharing program 150 may define a framework and data structure for demand-aware screen sharing that handles a selected demand object to share in an environment. The demand-aware screen sharing program 150 may also define, or itself serve as, a plugin and/or application which can be installed in an online conferencing application for monitoring user sharing demands, sharing demanded objects, and terminating on-demand shared objects. Additionally, the demand-aware screen sharing program 150 may allow administrators and users to configure and customize settings, attributes, and criteria; learning sharing patterns; monitor human computer interactions; identify participant names, identities, and/or roles; determine current discussion topics, title, name, or subject of the virtual conference; analyze user sharing intent for the determined current topics; recognize candidate content for sharing in the web conference; coordinating screen sharing activities of multiple participants and prioritizing the sharing of objects in a queue; and terminating a shared object according to changed sharing intention and demands in real time.

Additionally, prior to initially performing any actions, the demand-aware screen sharing program 150 may perform an opt-in procedure. The opt-in procedure may include a notification of the data the demand-aware screen sharing program 150 may capture and the purpose for which that data may be utilized by the demand-aware screen sharing program 150 during data gathering and operation. Furthermore, notwithstanding depiction in computer 101, the demand-aware screen sharing program 150 may be stored in and/or executed by, individually or in any combination, end user device 103, remote server 104, public cloud 105, and private cloud 106. The demand-aware screen sharing method is explained in more detail below with respect to FIGS. 2 and 3.

Referring now to FIG. 2, an operational flowchart for a demand-aware screen sharing process 200 according to at least one embodiment. At 202, the demand-aware screen sharing program 150 initiates a virtual conference between two or more participants. When two or more individuals wish to begin a web conference, the demand-aware screen sharing program 150 may identify this intention through user interactions with a graphical user interface where an initiating user opens a virtual conference room, and one or more other participants join the conference room. For example, Peter may act as a host participant for a web conference by starting a virtual conference room for a daily team scrum meeting and John and Kevin join Peter's room as guest participants.

In one or more embodiments, the demand-aware screen sharing program 150 may capture a participant's name and role (e.g., organizational role and/or conference role) upon a participant joining a web conference. Additionally, the demand-aware screen sharing program 150 may prompt a joining participant to designate one or more images, documents, or other files that the participant may wish to share in screen sharing session with the other participants during the web conference. In at least one other embodiment, the demand-aware screen sharing program 150 may perform a system scan of the joining participant's computing device, such as computer 101 or EUD 103, for any files that may be appropriate for the joining participant to share during the web conference. The demand-aware screen sharing program 150 may identify files through a file name comparison to a topic of the web conference and/or artificial intelligence techniques of the information within a file, such as, but not limited to, image recognition and natural language understanding.

Then, at 204, the demand-aware screen sharing program 150 monitors an audio feed of the video conference. During the web conference, the demand-aware screen sharing program 150 may continually analyze the ongoing audio conversation between the participants through audio analysis techniques, such as, but not limited to, speech-to-text, natural language processing. Through such techniques, the demand-aware screen sharing program 150 may determine a current topic of conversation of the web conference, any changes to the topic during the ongoing web conference, and any tangents on which the web conference conversation may digress. The demand-aware screen sharing program 150 may utilize machine learning techniques to determine trigger events that have historically been associated with a user's desire for sharing visual content with other web conference participants. For example, during the previously mentioned daily scrum meeting between Peter, John, and Kevin, John may audibly mention he is looking at a progress report and Kevin may reply with "Can you please share your screen with us?". The demand-aware screen sharing program 150 may determine such an exchange is typically followed by a user initiating a screen sharing session. The demand-aware screen sharing program 150 may be utilized to identify different types of events associated with screen sharing including manual screen sharing interruptions, accidental screen sharing, demand-based sharing, and screen sharing coordination.

The demand-aware screen sharing program 150 may aid in a reduction or elimination of any interruptions created when a user must manually begin a screen sharing session. For example, during a web conference meeting, Peter may wish to share a document to discuss product updates. However, he must pause or delay his presentation while he initiates the screen sharing session. Such interruptions or delays disrupt the flow of a meeting. The demand-aware screen sharing program 150 may detect Peter's intent to share a document based on his discussion topic and generate and display a prompt to Peter on a device graphical user interface with a suggestion to share his screen and a user-interactable icon to begin a screen sharing session.

The demand-aware screen sharing program 150 may also assist in the protection of information accidentally shared during a screen sharing session, whether a participant initiates screen sharing unintentionally or continues screen sharing beyond a period of time intended. For example, continuing the previous example, if John forgets to terminate a screen sharing session after a document review, he may share other information unintended for sharing in the web conference. The demand-aware screen sharing program 150 may actively monitor an audio feed of the web conference to determine the context of the conversation between the participants and the content displayed on the sharing participant's screen. The demand-aware screen sharing program 150 may recognize when the discussion between the participants is relevant to the shared display and, if the demand-aware screen sharing program 150 determines the conversation is no longer relevant to the displayed images, suggest to the sharing participant to end the screen sharing session. In one or more embodiments, the demand-aware screen sharing program 150 may automatically terminate a screen sharing session when the demand-aware screen sharing program 150 determines the conversation of the web conference is no longer contextually relevant to the images being displayed to prevent accidental exposure of unrelated content. To make an accurate determination of relevance of a shared image to the contextual setting of a web conference conversation, the demand-aware screen sharing program 150 may utilize artificial intelligence techniques, such as image recognition, speech-to-text, natural language processing, and natural language understanding, to relate the images displayed on a display screen to the conversation between participants. In one or more embodiments, the demand-aware screen sharing program 150 may topically categorize the content shared during the screen sharing session and the conversation between the participants. When the demand-aware screen sharing program 150 determines the categories of the content shared during the screen sharing session and the conversation between the participants are not the same or tangentially relevant within a preconfigured degree, the demand-aware screen sharing program 150 may suggest to the sharing participant to terminate the screen sharing session or, in one or more embodiments, automatically terminate the screen sharing session.

Furthermore, the demand-aware screen sharing program 150 may utilize demand-based sharing to determine when a user should initiate a screen sharing session. Similar to situations of accidental screen sharing described above, the demand-aware screen sharing program 150 may analyze the audio feed of the web conference to determine the context of the conversation between the participants and determine when a user should begin a screen sharing session. For example, if Lisa has important design mockups to share with her team but she is unsure when the right time to share those images with the team in a screen sharing session presents itself, the demand-aware screen sharing program 150 may identify the appropriate time and either prompt Lisa to begin a screen sharing session or automatically begin the session. To identify when a participant has images or documents to share in a web conference, the demand-aware screen sharing program 150 may prompt each participant, either at the time of accepting an invitation or at the time a participant enters the web conference, to upload, or otherwise identify, the images or documents the participant wishes to present or might be relevant for presentation based on the context of the conversation during the presentation. Upon receiving an indication of such images or documents, the demand-aware screen sharing program 150 may analyze the images or documents with artificial intelligence technologies, such as image recognition technology and natural language understanding, to determine the context of the images or documents. Thereafter, the demand-aware screen sharing program 150 may continually monitor the context of the audio conversation between the participants of the web conference and, upon determining the conversation is within a certain degree of context or certain keywords are spoken that are relevant to the images or documents identified by a participant, the demand-aware screen sharing program 150 may notify the participant that identified the images and/or documents and/or begin a screen sharing session of the applicable document. For example, if the demand-aware screen sharing program 150 determines the web conference conversation shifts to the topic of her mockups (e.g., John asks "Lisa, do you have the mockups we discussed?"), the demand-aware screen sharing program 150 may notify Lisa that the appropriate time for her to share her screen with the images of the mockups has arrived and/or automatically begin sharing her screen with the mockups displayed.

The demand-aware screen sharing program 150 may also assist in coordinating screen sharing sessions when multiple users wish to share their screens. The demand-aware screen sharing program 150 may aid in coordinating these screen sharing activities by recognizing when specific user content is related to the ongoing discussion of the web conference and suggests a coordinated screen sharing session transition from one participant to another. For example, continuing the previous scenario where Lisa is sharing her screen, Kevin may also which to share a code repository to demonstrate a software update to the team, however, he's not sure when an appropriate time would be to share that information since Lisa is currently sharing her screen for review of her design mockups. The demand-aware screen sharing program 150 may determine that Kevin's content is related to the ongoing discussion through an analysis of the document Kevin wishes to share and suggest a coordinated screen sharing transition when Lisa completes her presentation. The demand-aware screen sharing program 150 may present the transition as a pop-up window to the soon-to-be presenter (i.e., Kevin in the above scenario) and/or the entire web conference.

Next, at 206, the demand-aware screen sharing program 150 identifies a trigger event in the monitored audio feed. A trigger event may be any occurrence that signals to the demand-aware screen sharing program 150 that a participant wishes to start sharing to stop sharing of their device display screen view. The demand-aware screen sharing program 150 may utilize artificial intelligence technologies to determine the sharing demand presented by a participant during the web conference. Sharing demand may be scored at different levels based on an analysis of a user's sharing intention and the specific content of a conversation. Understanding the nuances in sharing demands by the demand-aware screen sharing program 150 may be crucial for effective operation. The demand-aware screen sharing program 150 may identify situations of low-level sharing demand where a user is willing to share their screen but doesn't express a strong urgency or specific intent. For example, a user may state "I can share the project status if you want". The demand-aware screen sharing program 150 may identify this low-level intent, tag it, and suggest sharing at an appropriate time rather than immediately. The demand-aware screen sharing program 150 may prioritize low-level sharing demand situations based on the relevance of those situations to the ongoing discussion of the web conference and may not initiate sharing immediately unless does so becomes highly relevance. Conversely, the demand-aware screen sharing program 150 may identify situations of high-level sharing demand where a user expresses a sense of urgency or strong intent to share their screen immediately. For example, a user may state "I really want to demo the customer-reported problem in our application." When a user expresses a high-level sharing demand, the demand-aware screen sharing program 150 may recognize the importance of this sharing and proactively suggest immediate screen sharing through a pop up to the specific user wishing to share or the entire web conference. The demand-aware screen sharing program 150 may prioritize such demands to ensure that critical content is shared promptly and without delay to the web conference as a whole.

Additionally, the demand-aware screen sharing program 150 may analyze the context and sentiment of user message through contextual analysis and sentiment analysis technologies, respectively. In doing these analyses, the demand-aware screen sharing program 150 may analyze the surrounding or overall conversation among the participants, the urgency of the topic, and the relevance of the content being shared. Such contextual and sentiment analyses aid the demand-aware screen sharing program 150 in determining the appropriate timing and level of sharing demand.

The demand-aware screen sharing program 150 may also utilize user preferences, user prompts, and real-time feedback to train a machine learning model for future demand-aware determinations. The demand-aware screen sharing program 150 may utilize user interactions and preferences to adapt its behavior in future situations based on individual user tendencies, such as specific users preferring immediate sharing while other users may prefer a more cautious approach. The demand-aware screen sharing program 150 may utilize prompts to clarify specific user intent rather than making an automatic decision to start or terminate screen sharing depending on a confidence value associated with the sharing demand. For example, if the demand-aware screen sharing program 150 determines, based on a historical model, with a high confidence level that a user has a high-level of sharing demand, the demand-aware screen sharing program 150 may automatically begin sharing that participant's screen. However, if the demand-aware screen sharing program 150 has a low confidence level of the user's sharing demand, the demand-aware screen sharing program 150 may display a prompt asking for the user's confirmation to begin screen sharing. Such a prompt may display, on a graphical user interface, "Would you like to share this content or should we wait for a more suitable moment?" Furthermore, the demand-aware screen sharing program 150 may utilize real-time feedback provided by web conference participants. For example, if a participant responds to the previously displayed prompt of "Would you like to share this content or should we wait for a more suitable moment?", the demand-aware screen sharing program 150 may store that real-time feedback and the event associated with that feed- back in a repository, such as storage 124, to further train a machine learning model for predicting user intents. The demand-aware screen sharing program 150 may utilize the trained model to predict overall user intents or specific user intents and further to calculate confidence levels of those predictions based on historical user actions and feedback for various contextual situations.

Then, at 208, the demand-aware screen sharing program 150 performs a screen sharing action based on the identified trigger event. As previously described, the trigger event may be the initiation of screen sharing or the termination of screen sharing depending on the specific context which the demand-aware screen sharing program 150 identifies in step 206. If the demand-aware screen sharing program 150 determines the trigger event is related to initiating a screen share for a participant, the demand-aware screen sharing program 150 may begin a screen sharing session for that participant to the web conference. If the demand-aware screen sharing program 150 determines the trigger event is related to terminating a screen share for a participant, the demand-aware screen sharing program 150 may terminate the screen sharing session of the participant to the web conference.

In one or more embodiments, the demand-aware screen sharing program 150 may determine that a participant desires to initiate a screen sharing session when another participant is actively participating in a screen sharing session. In such situations, the demand-aware screen sharing program 150 may generate a virtual queue where the participant wishing to begin a screen sharing session is virtually placed next in line to begin their screen sharing session when the participant actively sharing their screen completes their session. In an embodiment, the demand-aware screen sharing program 150 may prioritize the virtual queue based on the relevance of information that a participant wishes to share with the web conference has with the current conversation between the participants. For example, if Participant A is virtually queued to share their screen but the context of the web conference changes so that Participant B, who is virtually-queued behind Participant A, has information more pertinent to the current context of the web conference conversation, the demand-aware screen sharing program 150 may reprioritize the virtual queue to place Participant B in front of Participant A.

Referring now to FIG. 3, a functional block diagram of software components 300 used in the demand-aware screen sharing process 200 is depicted according to at least one embodiment. During operation through the steps of FIG. 2, the demand-aware screen sharing program 150 may interact with various sub-programs, sub-routines, and/or modules include, but not limited to, demand-aware screen sharing (DASS) server 302, and DASS client 304, which may be a defined framework for supporting the demand-aware screen sharing program 150. Additionally, the demand-aware screen sharing program 150 may include data and a data structure where the data includes, but is not limited to, web conference ID, virtual display, current topic, demand content, sharing queue list, and share status. Web conference ID may relate to a unique identifier for a web conference that distinguishes a specific web conference from other web conferences. Virtual display may relate to displayed information for a particular web conference participant while in a conference room. Current topic may relate to the topic to which a current conversation being discussed in a web conference as determined by various artificial intelligence technologies, such as a topic modeler, speech-to-text, and natural language processing/understanding techniques. Demand content may relate to a specific web conference participant's desire to share content with the web conference at a given point in time. As such, in one or more embodiments, demand content may be temporally related to the current topic. Sharing queue list may relate to one or more participants or files that are queued for sharing with the web conference. The sharing queue list may be prioritized in real-time based on one or more criteria, such as, but not limited to, topical relevance to the web conference as a particular point in time and participant desire to share the content with the web conference. Share status may relate to the current sharing status of a participant or file with the web conference. For example, if a participant is currently sharing their screen, share status may be tagged as "TRUE".

DASS server 302 may be a storage and communication platform for providing a more efficient and privacy protect- ing user screen sharing experience. DASS server 302 may host a DASS Manager 306, a DASS Learner 308, a DASS Determiner 310, and a DASS Coordinator 312.

DASS Client 304 may be a defined plugin and/or appli- cation iteration of the demand-aware screen sharing program 150 which can be installed in an online conferencing appli- cation (e.g., web browsers, virtual conference rooms, etc.) for monitoring user sharing demands, sharing demanded sharing objects, and terminating non-demanded shared objects. The DASS Client 304 may be host DASS Monitor 344. DASS Monitor 344 may observe human computer interactions (e.g., participant conversations and meeting contextual information) in a web conference. DASS Monitor 344 may integrate the monitored information into the data and data structure of the demand-aware screen sharing program 150.

DASS Manager 306 may host various data repositories, such as Service Profile 314, DASS Data Structure 318, DASS Criteria 320, and User Profiles 316, and allow admin- istrators and users to configure and customize settings (e.g., privacy protection, enforce user kick-out, etc.), attributes (e.g., sharing privileges, user role category, etc.) and criteria (e.g., sharing demand threshold, allow list for sharing, priority weights for different roles, etc.) for the demand- aware screen sharing program 150.

DASS Learner 308 may be a program or subroutine of the demand-aware screen sharing program 150 that learns shar- ing patterns 322 (e.g., relationship between sharing demand and shared object patterns in different meeting types and topics) through the training of a machine learning model through historical sharing of documents in web conferences and the timing and topic of those sharing events. The learning samples utilized by DASS Learner 308 may include meeting object sharing logs, meeting minutes, recorded meeting files, user feedback, etc.

DASS Determiner 310 may be a program or subroutine of the demand-aware screen sharing program 150 that deter- mines current discussion topics or intents of a web confer- ence (e.g., daily status meeting, review meeting, educational event, employee performance assessment, etc.). DASS Determiner 310 may utilize intent analyzer 324 to identify the sharing intent of specific participants during a web conference based on the current topic. The demand-aware screen sharing program 150 may also utilize a sharing demand recognizer 326 to calculate a sharing demand score related to each participant's intent to screen share during the web conference using historical data from previous web conferences with the user and all other users in a sample field. A high score may be associated with a high interest to screen share while a low score may be associated with a lower interest to screen share during a given topic. The sharing demand recognizer 326 may queue participants in a list from highest score to lowest score based on their sharing demand score.

DASS Coordinator 312 may coordinate screen sharing activities of multiple participants and prioritize the sharing objects in the sharing queue. DASS Coordinator 312 may manage sharing object selector 328, sharing agent 330, and DASS terminator 332. Sharing object selector 328 may select an object for sharing with the corresponding contents from the sharing queue list that is prioritized by the sharing demand recognizer 326. The sharing agent 330 may share the highest demand object from the sharing queue list with the most relevant contents (e.g., display the content on the user interface for the web conference and set the sharing participant's share status to "TRUE"). The DASS terminator 332 may terminate a shared object according to changed shared intention and demands in real time as determined by the demand-aware screen sharing program 150 (e.g., remove content being displayed on the user interface and set the sharing participant's share status to "FALSE").

It may be appreciated that FIGS. 2 and 3 provide only an illustration of one implementation and do not imply any limitations with regard to how different embodiments may be implemented. Many modifications to the depicted environments may be made based on design and implementation requirements.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method, the method comprising:

initiating a virtual conference between two or more participants, wherein the initiating further comprises:

identifying a topic of the virtual conference based on participant identities, participant roles, and a topic of the virtual conference based on a title of the virtual conference;

identifying a current topic of conversation of the two or more participants;

identifying a document stored on a user device related to the current topic;

performing a screen share of the document;

generating and training a machine learning model based on the screen share, a sharing of historical documents during web conferences, a timing of sharing the document, and a topic at the timing; and in response to determining the current topic has changed to a new topic, terminating the screen share.

2. The method of claim 1, wherein initiating the virtual conference further comprises:

receiving a file, stored on a user device associated with a participant of the two or more participants, relevant to the title.

3. The method of claim 2, further comprising:

identifying the file through a system scan of the user device.

4. A computer system, the computer system comprising:

one or more processors, one or more computer-readable memories, one or more computer-readable tangible storage media, and program instructions stored on at least one of the one or more tangible storage media for execution by at least one of the one or more processors via at least one of the one or more memories, wherein the computer system is capable of performing a method comprising:

initiating a virtual conference between two or more participants, wherein the initiating further comprises:

identifying a topic of the virtual conference based on participant identities, participant roles, and a topic of the virtual conference based on a title of the virtual conference;

identifying a current topic of conversation of the two or more participants;

identifying a document stored on a user device related to the current topic;

performing a screen share of the document;

generating and training a machine learning model based on the screen share, a sharing of historical documents during web conferences, a timing of sharing the document, and a topic at the timing; and in response to determining the current topic has changed to a new topic, terminating the screen share.

5. The computer system of claim 4, wherein initiating the virtual conference further comprises:

receiving a file, stored on a user device associated with a participant of the two or more participants, relevant to the title.

6. The computer system of claim 5, wherein the method further comprises:

identifying the file through a system scan of the user device.

7. A computer program product, the computer program product comprising:

one or more computer-readable tangible storage media and program instructions stored on at least one of the one or more tangible storage media, the program instructions executable by a processor capable of performing a method, the method comprising:

initiating a virtual conference between two or more participants, wherein the initiating further comprises:

identifying a topic of the virtual conference based on participant identities, participant roles, and a topic of the virtual conference based on a title of the virtual conference;

identifying a current topic of conversation of the two or more participants;

identifying a document stored on a user device related to the current topic;

performing a screen share of the document;

generating and training a machine learning model based on the screen share, a sharing of historical documents during web conferences, a timing of sharing the document, and a topic at the timing; and in response to determining the current topic has changed to a new topic, terminating the screen share.

8. The computer program product of claim 7, wherein initiating the virtual conference further comprises:

receiving a file, stored on a user device associated with a participant of the two or more participants, relevant to the title.

9. The computer program product of claim 8, wherein the method further comprises:

identifying the file through a system scan of the user device.

* * * * *